United States Patent
Rickis et al.

(10) Patent No.: US 10,030,779 B2
(45) Date of Patent: Jul. 24, 2018

(54) METERING DEVICES

(71) Applicant: Hamilton Sundstrand Corporation, Charlotte, NC (US)

(72) Inventors: Aaron F. Rickis, Feeding Hills, MA (US); August M. Coretto, Manchester, CT (US); Francis P. Marocchini, Somers, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 150 days.

(21) Appl. No.: 14/857,982

(22) Filed: Sep. 18, 2015

(65) Prior Publication Data

US 2017/0082204 A1   Mar. 23, 2017

(51) Int. Cl.
| | |
|---|---|
| *F16K 1/12* | (2006.01) |
| *F16K 1/36* | (2006.01) |
| *F16K 1/42* | (2006.01) |
| *F16K 31/06* | (2006.01) |
| *F02C 7/232* | (2006.01) |

(52) U.S. Cl.
CPC .............. *F16K 1/12* (2013.01); *F02C 7/232* (2013.01); *F16K 1/36* (2013.01); *F16K 1/42* (2013.01); *F16K 31/0665* (2013.01)

(58) Field of Classification Search
USPC .................. 137/625.28, 625.33; 251/282
See application file for complete search history.

(56) References Cited

U.S. PATENT DOCUMENTS

| | | | | |
|---|---|---|---|---|
| 1,044,828 | A | * | 11/1912 | Stumpf ................. E21B 34/101 137/629 |
| 1,277,153 | A | * | 8/1918 | Sullivan ................... F16K 1/44 137/625.35 |
| 1,998,241 | A | * | 4/1935 | Keen ........................ F16K 1/44 137/625.34 |
| 2,243,863 | A | * | 6/1941 | Hoy ......................... F16K 1/44 137/625.36 |
| 3,318,577 | A | | 5/1967 | Banks |
| 3,884,267 | A | * | 5/1975 | Grouwinkel .............. F02K 9/58 137/607 |
| 5,114,116 | A | | 5/1992 | Muller et al. |
| 5,501,245 | A | | 3/1996 | Lechevalier |

(Continued)

OTHER PUBLICATIONS

Extended European Search Report of the European Patent Office, dated Feb. 2, 2017, in corresponding European Patent No. 16187382.3.

*Primary Examiner* — John Fox
(74) *Attorney, Agent, or Firm* — Locke Lord LLP; Daniel J. Fiorello; Scott D. Wofsy

(57) ABSTRACT

A fluid metering valve includes a flow circuit defined by the valve and a valve member disposed in the flow circuit, the valve member having a sealing portion and configured to be moved by a solenoid between a closed position and one or more open positions. The valve includes a seat member defining one or more fluid outlets, the seat member configured to receive the sealing portion in the closed position to seal the fluid outlets, and an internal porting path defined through the sealing portion that is configured to fluidly connect a downstream side of the sealing portion with an upstream portion of the flow circuit in the closed position to reduce the effective pressure area of the valve member.

11 Claims, 6 Drawing Sheets

(56) References Cited

U.S. PATENT DOCUMENTS

| | | | |
|---|---|---|---|
| 6,394,135 B2 * | 5/2002 | Erickson | F16K 39/04 |
| | | | 137/625.38 |
| 6,601,784 B2 | 8/2003 | Muller-Girard, Jr. et al. | |
| 6,701,958 B2 * | 3/2004 | Baumann | F16K 39/022 |
| | | | 137/625.33 |
| 7,004,449 B2 | 2/2006 | Jansen | |
| 7,159,617 B2 * | 1/2007 | Erickson | F16K 11/202 |
| | | | 137/625.38 |
| 7,287,444 B2 | 10/2007 | Carne | |
| 9,038,662 B2 | 5/2015 | Rickis et al. | |
| 2005/0279959 A1 | 12/2005 | Gessaman | |
| 2009/0309053 A1 | 12/2009 | Farrow et al. | |

* cited by examiner

METERING DEVICES

BACKGROUND

1. Field

The present disclosure relates to fluid metering devices, more specifically to fluid metering valves.

2. Description of Related Art

Certain fluid metering valves (e.g., fuel valves for turbomachines) include a plunger assembly having a ball which divides an upstream and downstream side of a flow circuit. A seat is configured to receive the ball in a sealing relationship to close the flow path off. Such valves include a solenoid that is configured to pull the plunger assembly to one or more open positions to meter the fluid flow through the seat and the valve.

Such conventional methods and systems have generally been considered satisfactory for their intended purpose. However, there is still a need in the art for improved fluid metering valves. The present disclosure provides a solution for this need.

SUMMARY

In accordance with at least one aspect of this disclosure, a fluid metering valve includes a flow circuit defined by the valve and a valve member disposed in the flow circuit, the valve member having a sealing portion and configured to be moved by a solenoid between a closed position and one or more open positions. The valve includes a seat member defining one or more fluid outlets, the seat member configured to receive the sealing portion in the closed position to seal the fluid outlets, and an internal porting path defined through the sealing portion that is configured to fluidly connect a downstream side of the sealing portion with an upstream portion of the flow circuit in the closed position to reduce the effective pressure area of the valve member.

The seat member can include a cavity cup that defines a cavity. The cavity can be in fluid communication with the downstream side of the sealing portion. In certain embodiments, the valve member can include a valve plunger. The valve plunger can define a plunger portion of the internal porting path.

The sealing portion of the valve member can include a metering ball disposed in the valve plunger that defines a metering ball portion of the internal porting path. The cavity cup can be wider than the metering ball portion of the internal porting path.

The valve plunger portion of the internal porting path can include a plurality of openings. In certain embodiments, the valve plunger portion of the internal porting path can include at least one lateral portion (e.g., perpendicular with respect to an axial direction).

The seat member can include one or more angled, curved, and/or coined walls. The one or more fluid outlets can be defined in the one or more angled, curved, and/or coined walls.

The one or more fluid outlets can include a plurality of holes and/or slots defined above the cavity cup, through the seat member, to an outlet cavity downstream of the fluid outlets.

In accordance with at least one aspect of this disclosure, a valve member is configured to be disposed in a flow circuit of a valve and moved by a solenoid between a closed position and one or more open positions. The valve member includes a sealing portion, and an internal porting path as described above.

In accordance with at least one aspect of this disclosure, a seat member for a valve is configured to receive a sealing portion of a valve member and includes one or more fluid outlets and a cavity cup as described above.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
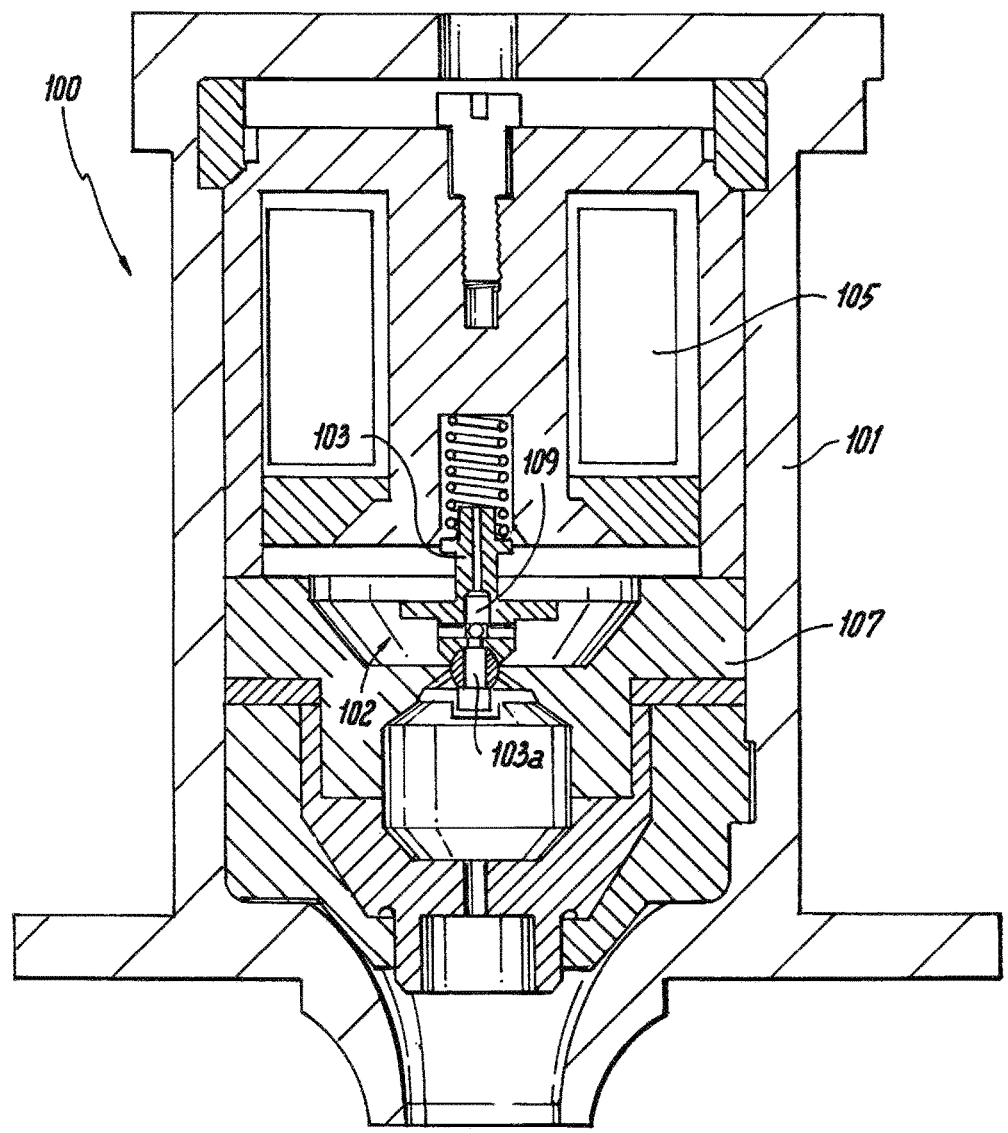
FIG. 1 is a cross-sectional elevational view of a valve in accordance with this disclosure, showing the valve in a closed position.

Reference will now be made to the drawings wherein like reference numerals identify similar structural features or aspects of the subject disclosure. For purposes of explanation and illustration, and not limitation, an illustrative view of an embodiment of a valve in accordance with the disclosure is shown in FIG. 1 and is designated generally by reference character 100. Other embodiments and/or aspects of this disclosure are shown in FIGS. 2A-4C. The systems and methods described herein can be used to reduce the working forces of a valve (e.g., to reduce size of solenoid required and thus reduce weight).

Figure 2A:
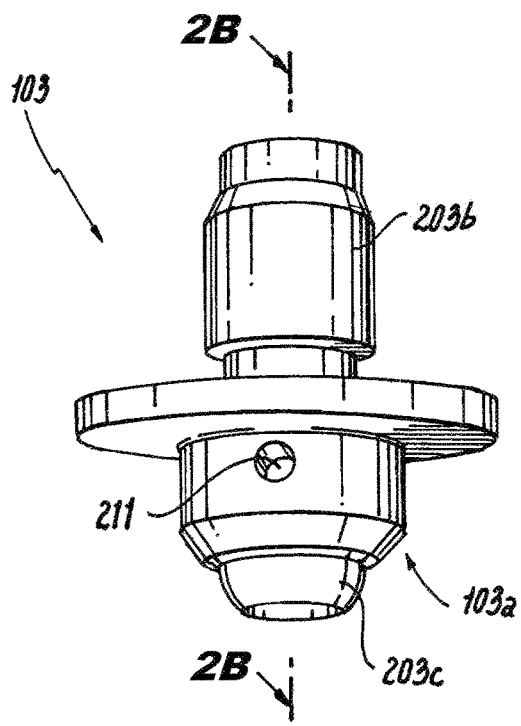
FIG. 2A is a perspective view of an embodiment of a valve member in accordance with this disclosure.
Figure 2B:
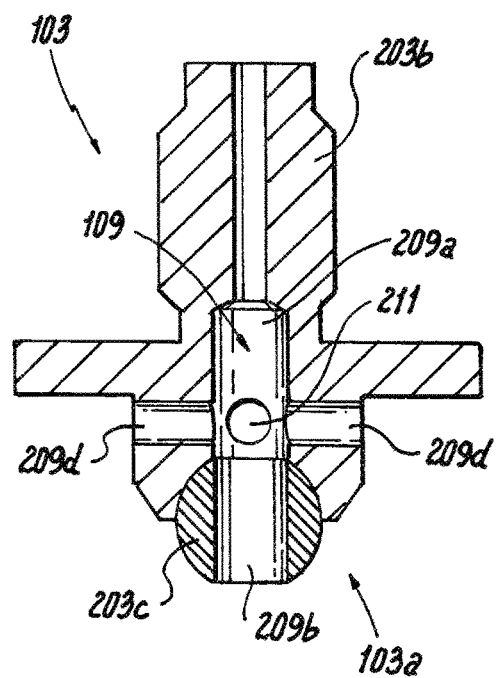
FIG. 2B is a cross-sectional elevational view of the valve member of FIG. 2A.

Referring to FIGS. 1-2B, a fluid metering valve 100 includes a flow circuit 102 defined by the valve 100 and a valve member 103 disposed in the flow circuit 102. The flow circuit 102 can be defined by any suitable components of the valve 100 (e.g., casing 101, solenoid 105, seat member 107).

The valve member 103 has a sealing portion 103a at a downstream end thereof and is configured to be moved by the solenoid 105 between a closed position (e.g., by a bias away from the solenoid 105) and one or more open positions (e.g., pulled toward the solenoid 105 by electromagnetic force, the amount of which being based on the current applied to the solenoid 105 to meter flow through the fluid circuit 102). An internal porting path is defined through the sealing portion 103a and is configured to fluidly connect a downstream side of the sealing portion with an upstream portion of the flow circuit in the closed position to reduce the effective pressure area of the valve member 103 in the closed position.

Referring to FIGS. 2A-2B, in certain embodiments, the valve member 103 can include a valve plunger 203b. The valve plunger 203b may define a plunger portion 209a of the internal porting path 209.

As shown, the sealing portion 103a of the valve member 103 can include a metering ball 203c disposed in the valve plunger 203b. The metering ball 203c can define a metering ball portion 109b of the internal porting path 109.

The valve plunger portion 209a of the internal porting path 109 can include a plurality of openings 211. In certain embodiments, the valve plunger portion 209a of the internal porting path 109 can include at least one lateral portion 209d. Any other suitable directions of one or more portions of the internal porting path 109 or any number/position of suitable inlets/openings in the plunger portion 203b are contemplated herein.

Figure 3A:
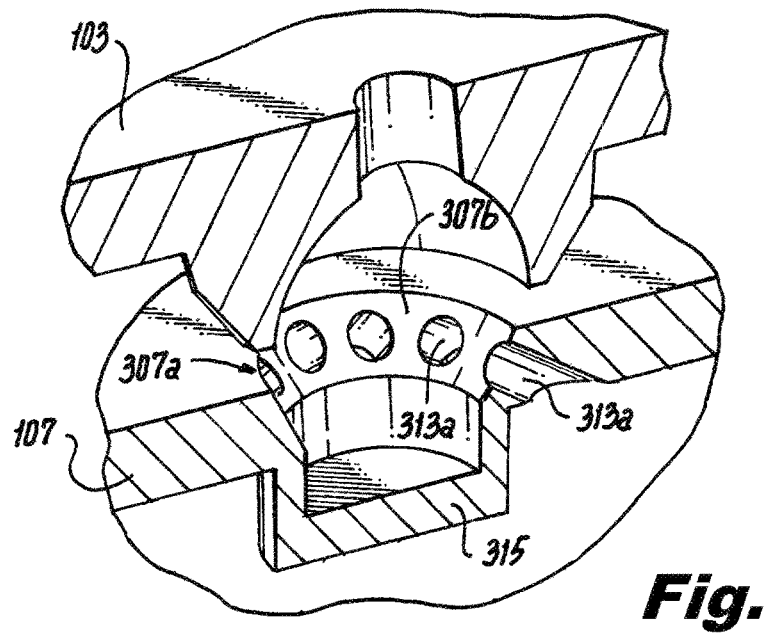
FIG. 3A is a cross-sectional perspective view of an embodiment of a seat of the seat member, shown having a plurality of holes for fluid outlets.
Figure 3B:
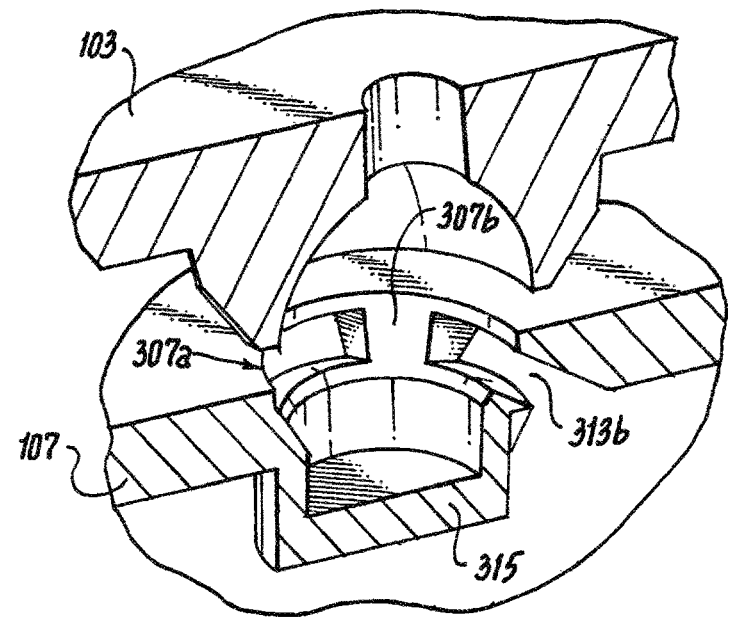
FIG. 3B is a cross-sectional perspective view of an embodiment of a seat of the seat member, shown having a plurality slots for fluid outlets.

Referring to FIGS. 1, 3A, and 3B, the valve 100 includes a seat member 107 defining one or more fluid outlets (e.g., outlets 313a and/or 313b) at a seat 307a. The seat member 107 is configured to receive the sealing portion 103a of the valve member 103 in the seat 307a when in the closed position to seal the fluid outlets (e.g., outlets 313a and/or 313b).

As shown, the seat 307a of the seat member 107 can include one or more angled, curved, and/or coined walls 307b for receiving the metering ball 203c and/or any other suitable part of sealing portion 103b. The walls 307b can be angled, curved, and/or coined in any suitable manner (e.g., coined by pressing the sealing member or other die into the seat member 107 to plastically deform the walls 307b to the shape of the sealing member). The one or more fluid outlets (e.g., outlets 313a and/or 313b) can be defined in the one or more angled, curved, and/or coined walls 307b. The angled, curved, and/or coined walls 307b allows for a larger foot print for metering windows. The steeper the angled, curved, and/or coined walls 307b, the lower the axial projected area and thus the lower the working forces.

As shown in FIG. 3A, the fluid outlets 313a include one or more holes formed through the seat member in any suitable manner (e.g., drilling, additively manufacturing). In certain embodiments, as shown in FIG. 3B, the fluid outlets 313b can include one or more slots formed through the seating member in any suitable manner. Any other suitable fluid outlet shape and/or size is contemplated herein.

Figure 4A:
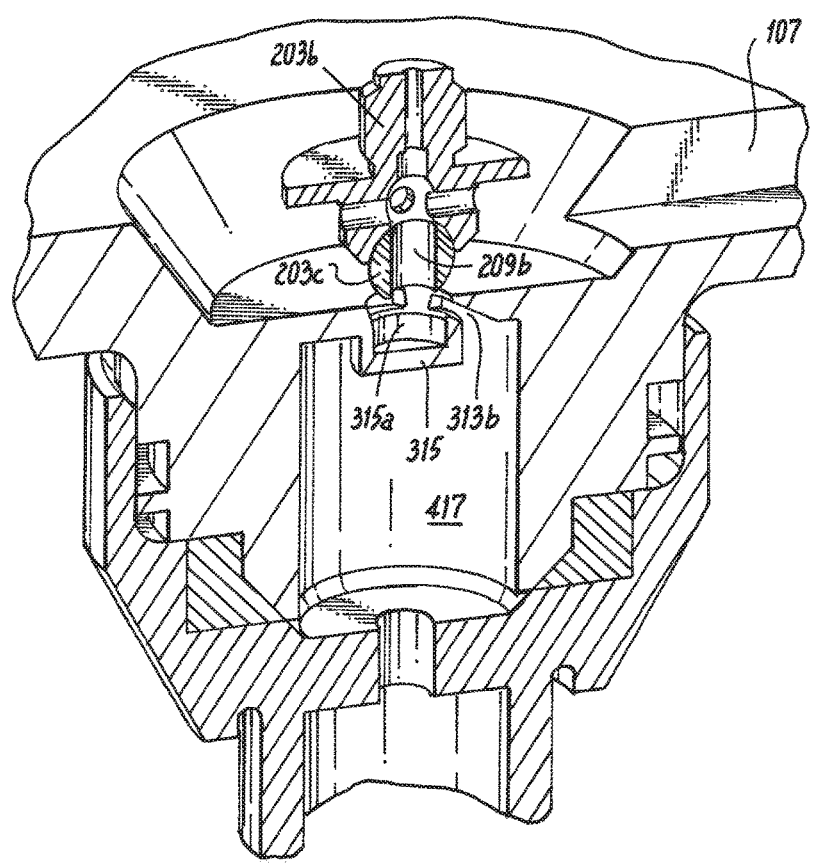
FIG. 4A is a cross-sectional perspective view of an embodiment of a valve member disposed in an embodiment of a seat member, shown in the open position.
Figure 4B:
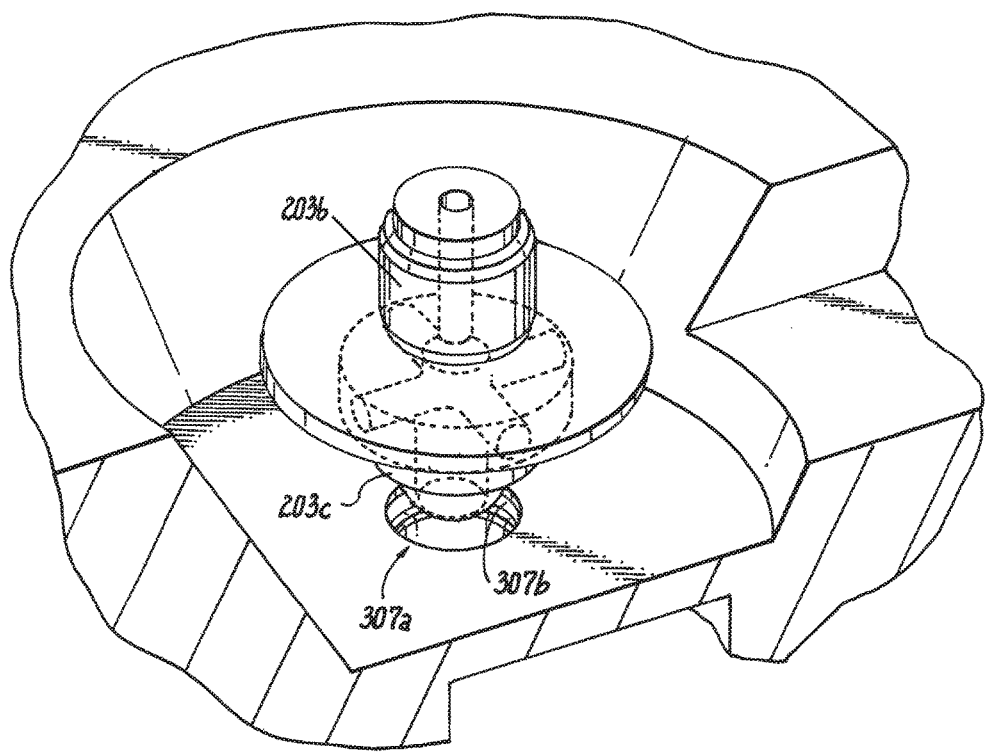
FIG. 4B is a perspective view of an embodiment of a valve member disposed in an embodiment of seat member, shown in the open position.
Figure 4C:
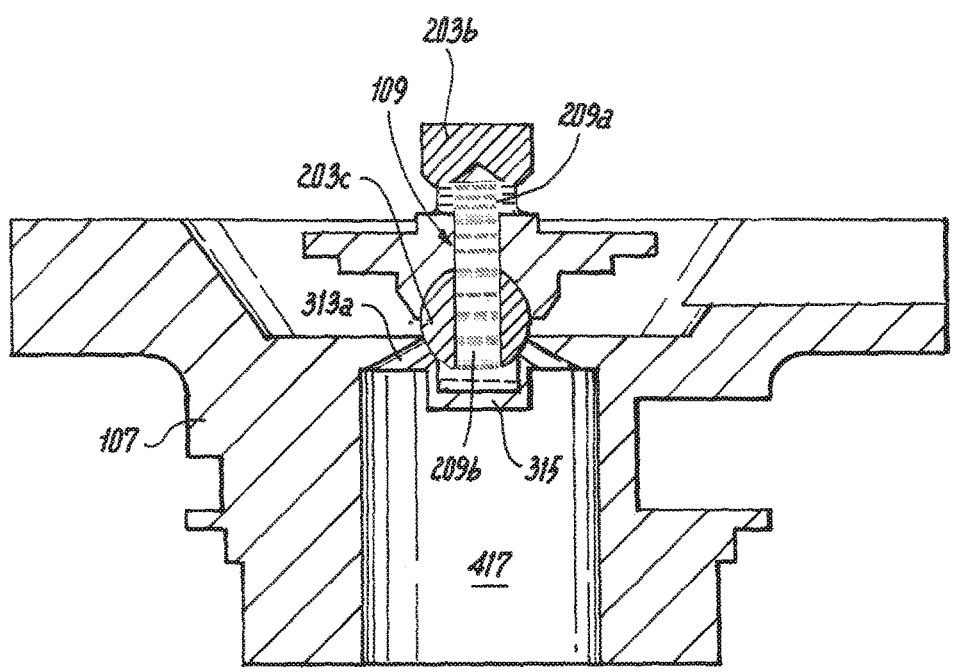
FIG. 4C is a cross-sectional elevational view of a valve member and seat member in accordance with this disclosure, shown under fluid pressure in a closed position.

Referring additionally to FIGS. 4A-4C, the seat member 107 can include a cavity cup 315 that defines an upstream pressure cavity 315a in fluid communication with the downstream side of the sealing portion 103a. The one or more fluid outlets (e.g., outlets 313a and/or 313b) can be defined above the cavity cup 315, through the seat member 107, to an outlet cavity 417 downstream of the fluid outlets (e.g., outlets 313a and/or 313b).

As shown, the cavity cup 315 can be wider than the metering ball portion 209b of the internal porting path 109. However, it is contemplated that the metering ball portion 209b of the internal porting path 109 can be the same width as the cavity 315a.

As described above, the pressure area of seat 307a (e.g., the projected axial area of the seat 307a), which must be overcome by the solenoid 105 for the solenoid 105 to pull the valve member 103 to an open position, is reduced as compared to traditional valves. A significant reduction in working forces is therefore realized because the pressure that must be overcome by the solenoid is reduced by allowing high pressure flow to pass through the sealing portion 103a in the closed position. In addition, due to the shape of the walls of the seat 307a, as the sealing portion 103a is displaced, the pressure area is further reduced resulting in even lower working forces. The use of the Metering Ball can result in significantly reduced working forces. This allows the use of smaller electro-mechanical mechanisms (e.g., solenoids, stepper motors, etc.).

The methods and systems of the present disclosure, as described above and shown in the drawings, provide for metering devices with superior properties including reduced weight and working forces. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A fluid metering valve, comprising:
a flow circuit defined by the valve;
a valve member disposed in the flow circuit, the valve member having a sealing portion and configured to be moved by a solenoid between a closed position and one or more open positions;
a seat member defining one or more fluid outlets, the seat member configured to receive the sealing portion in the closed position to seal the fluid outlets, wherein the seat member includes a cavity cup that defines a cavity in fluid communication with the downstream side of the sealing portion, wherein the one or more fluid outlets include a plurality of holes and/or slots defined above the cavity cup, through the seat member, to an outlet cavity downstream of the fluid outlets, wherein the seat member includes one or more angled, curved, and/or coined walls, wherein the one or more fluid outlets are defined in the one or more angled, curved, and/or coined walls; and
an internal porting path defined through the sealing portion that is configured to fluidly connect a downstream side of the sealing portion with an upstream portion of the flow circuit in the closed position to reduce the effective pressure area of the valve member.

2. The valve of claim 1, wherein the valve member includes a valve plunger.

3. The valve of claim 2, wherein the valve plunger defines a plunger portion of the internal porting path.

4. The valve of claim 3, wherein the sealing portion of the valve member includes a metering ball disposed in the valve plunger that defines a metering ball portion of the internal porting path.

5. The valve of claim 4, wherein the cavity cup is wider than the metering ball portion of the internal porting path.

6. The valve of claim 5, wherein the valve plunger portion of the internal porting path includes a plurality of openings.

7. The valve of claim 6, wherein the valve plunger portion of the internal porting path includes at least one lateral portion.

8. A valve member configured to be disposed in a flow circuit of a valve and moved by a solenoid between a closed position and one or more open positions, the valve member comprising:
a sealing portion; and
an internal porting path defined through the sealing portion that is configured to fluidly connect a downstream side of the sealing portion with an upstream portion of the flow circuit in the closed position to reduce the effective pressure area of the valve member, wherein the valve member includes a valve plunger, wherein the valve plunger defines a plunger portion of the internal porting path, and wherein the sealing portion of the valve member includes a metering ball disposed in the valve plunger that defines a metering ball portion of the internal porting path.

9. The valve of claim 8, wherein the valve plunger portion of the internal porting path includes a plurality of openings.

10. The valve of claim 9, wherein the valve plunger portion of the internal porting path includes at least one lateral portion.

11. A seat member for a valve configured to receive a sealing portion of a valve member, comprising:
- one or more fluid outlets;
- a cavity cup that defines a cavity in fluid communication with the downstream side of the sealing portion, wherein the one or more fluid outlets include a plurality of holes and/or slots defined above the cavity cup, through the seat member, to an outlet cavity downstream of the fluid outlets; and
- one or more angled, curved, and/or coined walls, wherein the one or more fluid outlets are defined in the one or more angled, curved, and/or coined walls.

* * * * *